(12) United States Patent
Lamere et al.

(10) Patent No.: US 9,141,694 B2
(45) Date of Patent: Sep. 22, 2015

(54) METHOD AND APPARATUS FOR USER-STEERABLE RECOMMENDATIONS

(75) Inventors: Paul B. Lamere, Nashua, NH (US); Stephen J. Green, Burlington, MA (US); Jeffrey H. Alexander, Arlington, MA (US); François Maillet, Brossard (CA); Douglas Eck, Montreal (CA)

(73) Assignee: Oracle America, Inc., Redwood City, CA (US)

( * ) Notice: Subject to any disclaimer, the term of this patent is extended or adjusted under 35 U.S.C. 154(b) by 1808 days.

(21) Appl. No.: 12/338,596

(22) Filed: Dec. 18, 2008

(65) Prior Publication Data

US 2010/0161620 A1    Jun. 24, 2010

(51) Int. Cl.
G06F 7/00 (2006.01)
G06F 17/30 (2006.01)

(52) U.S. Cl.
CPC .... *G06F 17/30749* (2013.01); *G06F 17/30764* (2013.01); *G06F 17/30766* (2013.01)

(58) Field of Classification Search
CPC .................. G06F 17/30749; G06F 17/30764; G06F 17/30766
USPC .......................................... 707/749, E17.014
See application file for complete search history.

(56) References Cited

U.S. PATENT DOCUMENTS

| | | | |
|---|---|---|---|
| 7,899,763 B2* | 3/2011 | Machulsky et al. ............. 706/12 | |
| 2006/0284873 A1 | 12/2006 | Forrest et al. | |
| 2007/0174247 A1 | 7/2007 | Xu et al. | |
| 2008/0071929 A1 | 3/2008 | Motte et al. | |
| 2008/0072145 A1* | 3/2008 | Blanchard et al. ............ 715/273 |
| 2008/0092044 A1* | 4/2008 | Lewis et al. ..................... 715/713 |
| 2009/0094189 A1* | 4/2009 | Stephens ............................. 707/2 |
| 2009/0125588 A1* | 5/2009 | Black et al. ..................... 709/204 |
| 2009/0132526 A1* | 5/2009 | Park .................................. 707/5 |
| 2009/0157618 A1* | 6/2009 | Matheny .......................... 707/3 |
| 2009/0182727 A1 | 7/2009 | Majko | |
| 2009/0204493 A1* | 8/2009 | Kim ................................ 705/14 |
| 2009/0287989 A1* | 11/2009 | Chakra et al. ................. 715/205 |
| 2010/0030552 A1* | 2/2010 | Chen et al. ........................ 704/9 |
| 2010/0076968 A1* | 3/2010 | Boyns et al. ................... 707/732 |
| 2010/0114907 A1* | 5/2010 | Kirby ............................. 707/748 |

(Continued)

OTHER PUBLICATIONS

U.S. Appl. No. 12/338,585, filed Dec. 18, 2008.

*Primary Examiner* — James Trujillo
*Assistant Examiner* — Jessica N Le
(74) *Attorney, Agent, or Firm* — Robert C. Kowert; Meyertons, Hood, Kivlin, Kowert & Goetzel, P.C.

(57) ABSTRACT

Method and apparatus for transparent, steerable recommendations. A steerable recommender uses tag clouds including descriptive tags and associated weights to generate recommendations. Users may dynamically interact with the recommender via a user interface to steer the recommendations. A tag cloud for an item is displayed, items for which associated tag clouds are most similar to the displayed tag cloud are identified, and the items are displayed as recommendations. The strength of similarity of the items to the displayed tag cloud may be displayed. The user may modify a tag cloud, for example by changing the weight of a tag or by adding or removing a tag, and the recommendations may be automatically updated to reflect the modification. A recommended item may be selected to display the tag cloud corresponding to the item. A user may select a user interface element to request information on why a particular item was recommended.

20 Claims, 10 Drawing Sheets

(56) References Cited

U.S. PATENT DOCUMENTS

| | | | |
|---|---|---|---|
| 2010/0131899 A1* | 5/2010 | Hubert | 715/823 |
| 2011/0173216 A1* | 7/2011 | Newman et al. | 707/765 |
| 2011/0238675 A1* | 9/2011 | Schachter | 707/749 |

* cited by examiner

METHOD AND APPARATUS FOR USER-STEERABLE RECOMMENDATIONS

BACKGROUND

The amount of content on the Internet is growing dramatically. Recommender technology is key to helping people find new, interesting and relevant items in this content. For example, music recommendation systems are increasingly important in the ever-growing world of digital music. A recommender is a tool that recommends one or more items to a user based on one or more provided criteria. Conventional recommenders typically use some form of collaborative filtering that exploits the wisdom of the crowds to make recommendations of the form "people who bought X also bought Y." A recommender using collaborative filtering generally relies on the names or titles of items to make recommendations. Such a recommender, directed at music, may take the title(s) of music that a user has expressed interest in or purchased, look for other people who have purchased the same title(s), determine one or more other titles that the other people have purchased but the user has not, and recommend one or more of the other titles to the user.

Conventional recommenders that rely on collaborative filtering generally do not provide reasons as to why an item is recommended beyond "Other people who selected item X also selected item Y." Further, these conventional recommenders typically provide limited ability to interact with the recommender. A user receiving a bad recommendation may know a reason why they do not like the recommendation, but the user is not provided with a method to provide this information to the recommender, and even if they could, a collaborative filtering-based recommender would not know what to do with the information. In addition, these conventional, collaborative filtering-based recommenders are generally not steerable except by applying explicit ratings to items or by applying filters on the metadata returned with the items. In these conventional recommenders, providing a rating may affect future recommendations, but it is difficult to determine, and to explain, how one rating action will affect future recommendations.

SUMMARY

Embodiments of a method and apparatus for programmatically generating transparent, steerable recommendations are described. A recommender is described that generates transparent, steerable recommendations. The steerable recommender uses meaningful words or phrases that are descriptive of particular items to drive the recommendations, as opposed to conventional recommenders that rely on collaborative filtering. Users may dynamically interact with the recommender to steer recommendations towards more relevant content, and thus may receive more personalized and directed recommendations.

A steerable recommender may provide a user interface. The steerable recommender may receive user input, via the user interface, specifying a tag cloud. The tag cloud may include one or more tags and weights for the tags. For example, a user, via the user interface, may request recommendations for items similar to a particular item that the user likes. Alternatively, the user may simply select an item via the user interface. In addition, a tag cloud for a particular item may be displayed on the user interface, and the user may modify the tag cloud, for example by interactively changing the weight of a particular tag, or by adding or removing a tag. As another alternative, the user may submit a custom tag cloud not associated with any particular item to the steerable recommender via the user interface. Other methods of accepting user input via a user interface specifying a tag cloud and related information are possible and contemplated. The user input may, but does not necessarily, cause the retrieval of information related to the tag cloud from information currently displayed on the user interface. For example, the user input may only identify an item, and the steerable recommender may obtain the tag cloud and related information from a data store that stores collected tag clouds for related items, or from some other location if the tag cloud is not in the data store. In one embodiment, if there is no tag cloud for a specified item in the data store, the recommendation engine may dynamically generate a tag cloud for the item in response to the user input.

A set of items for which associated tag clouds are most similar to the specified tag cloud may be identified. Information may be displayed, to the user interface, identifying the set of items and indicating similarity to the specified tag cloud. The displayed information may include a set or list of items that are similar to the specified item according to comparisons of the tag clouds, or a set or list of items whose tag clouds are similar to a specified custom tag cloud if the user has submitted a custom tag cloud not related to a particular item. A value indicating the strength of the similarity to the specified item may be displayed with each item. At least a subset of the list of items, and the associated strength of similarity value, may be displayed to the user interface. The user interface may include a scrollbar or other user interface element that allows a user to view additional items on the list if all the items cannot be displayed in the space provided.

In one embodiment, a user may select a displayed item in the list of recommended items, and the tag cloud for that item may then be displayed. The tag cloud may be displayed, for example, by displaying the tags (descriptive words or phrases) in the tag cloud. The relative weights of the tags may be indicated, for example by displaying tags with higher weights at larger font sizes. In one embodiment, in response to the user selecting an item from the list, in addition to displaying the tag cloud for the selected item, the recommendation list may automatically be updated to display items recommended according to the tag cloud of the selected item. In one embodiment, a user may modify a currently displayed tag cloud via the user interface, for example by interactively changing the weight of a tag, or by adding or removing a tag, and the list of recommended items may be automatically updated to reflect the user's modification of the tag cloud.

In one embodiment, a steerable recommender may receive user input, via a user interface to the steerable recommender, requesting information on why an item was recommended. In one embodiment, a user interface element may be associated with each item in the displayed list of recommended items. A user may select this interface element to request information on why the particular item was recommended. Information may be displayed, to the user interface, indicating why the item was recommended in response to the user input. In one embodiment, since recommendations made by the steerable recommender are based on the similarity between a user-specified tag cloud and the tag clouds of the recommended item(s), a more detailed explanation of why an item was recommended may be provided by displaying how the two tag clouds overlap.

Figure 1:
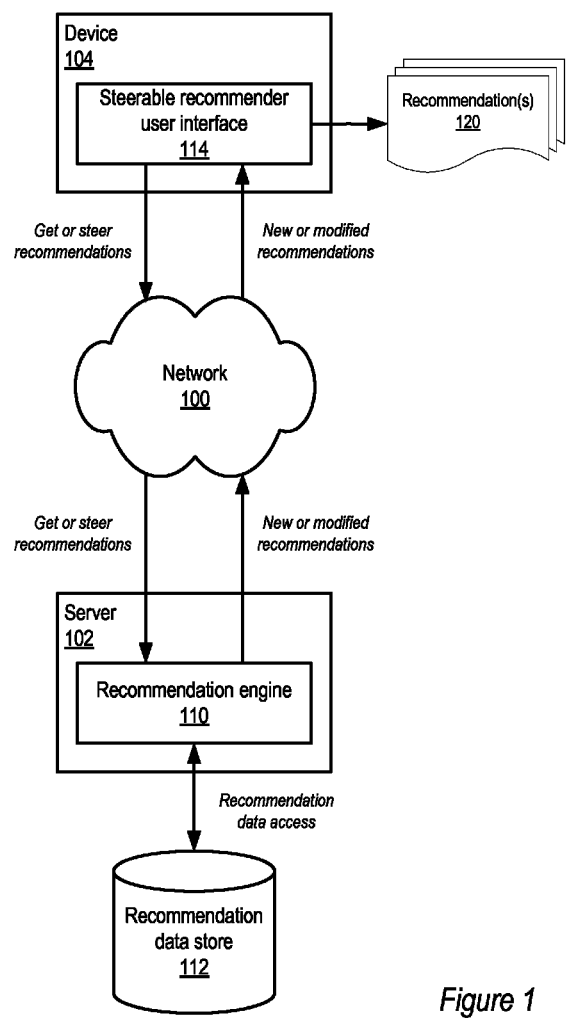
FIG. 1 is a block diagram that illustrates a networked environment implementation of a steerable recommender according to some embodiments.

While the system is described herein by way of example for several embodiments and illustrative drawings, those skilled in the art will recognize that the system is not limited to the embodiments or drawings described. It should be understood, that the drawings and detailed description thereto are not intended to limit the system to the particular form disclosed but on the contrary, the intention is to cover all modifications, equivalents and alternatives falling within the spirit and scope of the present system as defined by the appended claims. The headings used herein are for organizational purposes only and are not meant to limit the scope of the description or the claims. As used throughout this application, the word "may" is used in a permissive sense (i.e., meaning having the potential to), rather than the mandatory sense (i.e., meaning must). Similarly, the words, "include", "including", and "includes" mean including, but not limiting to.

DETAILED DESCRIPTION OF THE EMBODIMENTS

Embodiments of a method and apparatus for programmatically generating transparent, steerable recommendations are described. A recommender is described that generates transparent, steerable recommendations. The steerable recommender uses meaningful words or phrases that are descriptive of particular items to drive the recommendations, as opposed to conventional recommenders that rely on collaborative filtering. Users may dynamically interact with the recommender to steer recommendations towards more relevant content, and thus may receive more personalized and directed recommendations. The steerable recommender may allow a user to interactively and dynamically explore a complex set of items. This interactivity may lead to recommendations that are highly relevant and novel. Unlike conventional recommenders, embodiments of the steerable recommender, via the use of meaningful words and phrases, may provide explanations as to why particular items were recommended, thus providing transparency to the recommendations. This transparency may enhance the trust that a user has in the recommender. The transparency and interactivity of the steerable recommender may help the user in finding new and interesting items, and may also be more engaging and enjoyable for the user than conventional recommenders.

An item, as used herein, refers to a particular instance of a category of items for which recommendations may be generated. Categories of items for which recommendations may be generated using embodiments may include, but are not limited to: artists (musicians, authors, painters, poets, directors, etc.), artistic works (albums, songs, books, paintings, poems, movies, cable/television shows, etc.), scholarly or other works (white papers, research papers, scientific publications, publications such as electronic or paper magazines or newspapers, etc.), consumer products (computers, cars, personal electronics, appliances, computer software products, etc.), retail or service businesses (restaurants, retail stores, online retailers, brick-and-mortar or online service businesses, etc.), institutions (schools, hospitals, etc.), service persons (doctors, plumbers, lawyers, mechanics, etc.), and Web sites (blogs, discussion boards, etc.). In general, recommendations for any category of item for which descriptive tags may be generated and acquired may be generated and manipulated by embodiments of the steerable recommender. While embodiments may be applied to any such category of item, embodiments are described herein that are directed at music and musical artists by way of example.

An issue with conventional collaborative filtering-based recommenders may be referred to as the "cold start" problem. A fairly large base of users and number of transactions may be required to make the "Other people who bought item X also bought item Y" recommendations provided by these types of recommenders useful for a web enterprise. Thus, at startup of such a recommender, there may not be enough data to make meaningful and useful recommendations for at least some items. This issue may be referred to as the "cold start" problem. Using descriptive tags rather than collaborative filtering for generating recommendations allows embodiments of the steerable recommender to collect meaningful descriptive information for items from network or other sources as described above, and thus to make meaningful and useful recommendations even for a new recommender that does not have many users.

Other issues with conventional collaborative filtering-based recommenders may include a lack of sales information for new items. Thus, new items, especially if not popular sellers, may tend to not get recommended or get low-priority recommendations when in fact these new items may include items that would be of interest to the user. Similarly, rarely purchased or not-as-popular items tend to get under-recommended or not recommended by conventional recommenders. Furthermore, very popular items may tend to be over-recommended or recommended for items not very similar to the item on which the recommendation is based. Using descriptive tags rather than collaborative filtering for generating recommendations allows embodiments of the steerable recommender to collect meaningful descriptive information for items from network or other sources as described above, even for new and rarely purchased or not-as-popular items, and thus to include meaningful and useful recommendations for these items when a tag cloud submitted by a user closely matches the tag clouds for these items. Furthermore, since the recommendations are not based on popularity, very popular items may not be over-recommended or recommended for items not very similar to the item on which the recommendation is based.

Embodiments of the steerable recommender allow a user, via the user interface component of the steerable recommender, to find similar items to an item or to a set of items according to the descriptive information, or tag cloud. In embodiments, the recommendation engine component of the steerable recommender may use vector space distance calculations, for example the cosine distance between the tag clouds, to determine item similarity for items in the data store. In one embodiment, the results of a find similar operation may be filtered by a recommendation engine component of the steerable recommender to optimize relevance, novelty and familiarity in accordance with preferences of the user.

One embodiment may allow a user to construct a tag cloud independent of any particular item and use this tag cloud as input to the steerable recommender. This tag cloud may describe the parameters that are important to the user. The steerable recommender may use the find similar technique to find items that are similar to the tag cloud, and return the similar items (potentially filtered) as recommendations to the user.

In some embodiments, user may interact with a tag cloud via the user interface component of the steerable recommender. For example, in one embodiment, the user may dynamically adjust the weights of tags in the tag cloud interactively, receiving updated recommendations after every adjustment. This allows the user to steer the recommender towards items that are of interest to the user. By allowing a user to control and steer a recommender, embodiments of the steerable recommender may allow users to find items that are more relevant to the user's particular interests or tastes than do conventional recommenders. Examples of steerable recommender user interfaces are provided in FIGS. 6 through 8.

As an example directed at musical artists, a user may like the artist Jimi Hendrix. The user may go to an online music retailer that uses a conventional recommender that uses collaborative filtering. The user may pose a query 'find more music like Jimi Hendrix.' The user receives recommendations for artists such as Janis Joplin and the Doors (representing the 60s and psychedelia aspects of Hendrix), as well as Eric Clapton, Stevie Ray Vaughan, and Steve Vai (representing the guitar virtuoso aspects of Hendrix). However, the user may be more interested in the guitar playing aspects of Hendrix, and less interested in other aspects such as psychedelia. However, the conventional, collaborative filtering recommender gives the user little or no control over what is recommended.

Using an embodiment of the steerable recommender directed at recommendations for musical artists, the user may obtain or generate a tag cloud for Jimi Hendrix and use that as the starting point for a recommendation query. In one embodiment, the tag cloud may be represented on a display screen such that higher weighted tags in the cloud are shown in a larger font. The user may use the cursor control device to adjust or manipulate the tags in the tag cloud. For example, the user may, via the user interface, add new tags, remove tags, or increase or decrease the weights of the tags via a cursor control device click-and-drag to resize the tags. The user may make the weight of a tag go negative, indicating that the user wants to avoid items with that tag. The user may use the cursor control device to make the 'psychedelia' tag smaller. Immediately, the list of recommended artists is updated and artists with strong 'psychedelia' tags are demoted in the list of recommendations. The user then uses the cursor control device to make the 'guitar' tag larger. Again, the recommended artists are immediately updated to emphasize artists with strong guitar tags. The user decides that he prefers more contemporary music, so the user deletes the '60s' tag from the tag cloud and adds a '00s' tag to the cloud. Again, the recommendations update reflecting the user's interests.

As another example, a user may like a wide variety of music. By examining artists that the user likes to listen to and the associated play counts, an embodiment of the steerable recommender may automatically build a tag cloud that represents the user's taste, or alternatively may allow the user to construct the personal tag cloud. The steerable recommender may then use this tag cloud to make recommendations for the user. However, the user may not always be in the mood for the same kinds of music. While working, the user may prefer music with no vocals; while driving, the user may prefer upbeat music; while reading, the user may prefer quiet music. The user may use the steerable recommender along with the user's personal tag cloud to find music that the user may like that fits the user's particular mood. For instance, to find music for work, the user may start with the personal tag cloud and deemphasize the vocal tags. The steerable recommender returns music recommendations that the user may like and that matches the tags that are more heavily weighted in the personal tag cloud, but with few vocals. The user may save this tag cloud and reuse it when desired to get a new set of music to listen to while working.

Figure 14:
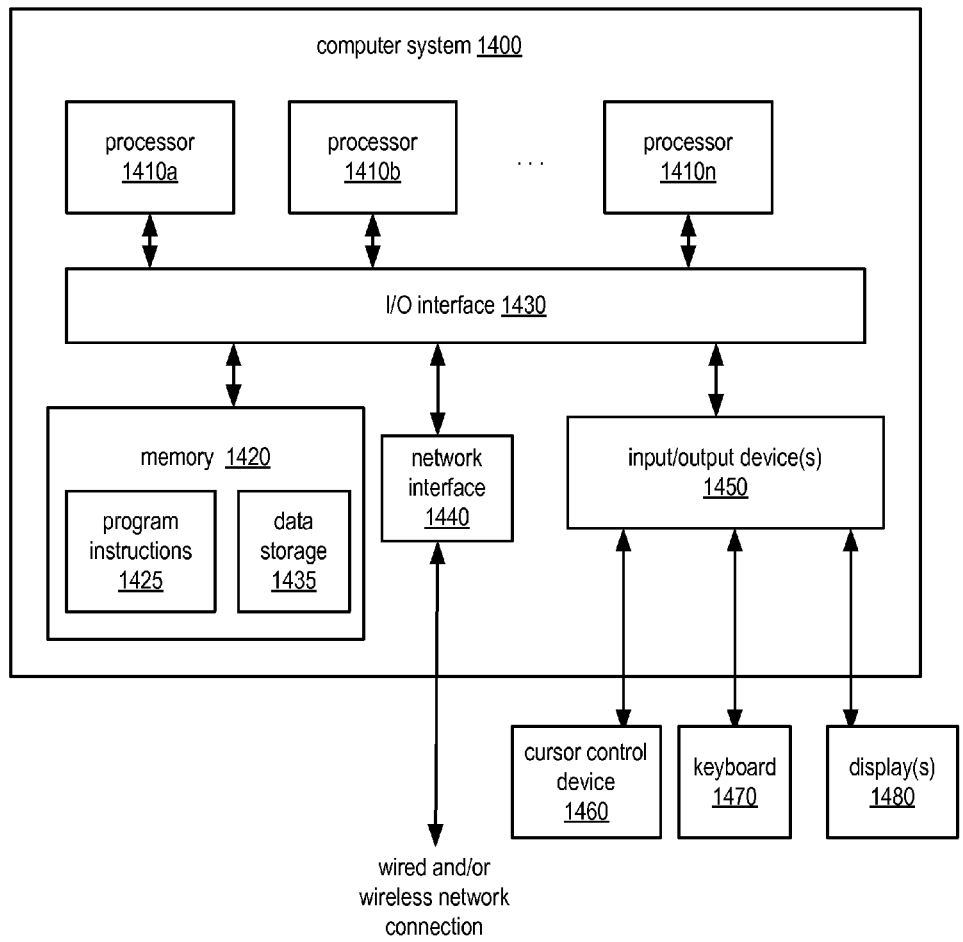
FIG. 14 is a block diagram of a computing device, according to some embodiments.

FIG. 1 is a block diagram that illustrates a networked environment implementation of a steerable recommender according to some embodiments. In these embodiments, a server 102 coupled to a network 100 may host an instance of recommendation engine 110 and a recommendation data store 112. Network 100 may, for example, be a local area network, a wide area network, or the Internet. An example computer system that may be used as a server 102 is illustrated in FIG. 14. Device 104 includes an instance of steerable recommender user interface 114. Device 104 may, for example, be representative of a personal desktop or portable computer system, or of any of various types of personal electronic devices with network connectivity such as a portable digital audio file player (e.g., an MP3 player), personal digital assistant (PDA), or cell phone. An example computer system that may be used as a device 104 is illustrated in FIG. 14. Steerable recommender user interface 114 may, for example, be implemented as a page or pages displayable on or by a web browser. Alternatively, steerable recommender user interface 114 may be implemented as or on one or more display pages of a network-enabled client software program.

In one embodiment, server 102 may provide a web site accessible to client(s) via web browsers on device(s) 104. The web site may display a steerable recommender user interface 114 as or on one or more pages of the web site. The user may submit requests for recommendations to the steerable recommender via the user interface 114. A user may, for example, specify an artist name or a song via the steerable recommender user interface 114, may submit a tag cloud, may modify a tag in a displayed tag cloud, or may provide some other input to the steerable recommender via the user interface. The user input may be sent to the recommendation engine 110 on server 102 via the Internet 100 in one or more messages. Recommendation engine 110 may then process the request and return information to the device 104 via Internet 100. To process the request, recommendation engine 110 may access recommendation data store 112 to find recommendations by comparing the tag clouds of items in the data store 112 with a tag cloud provided by the user via the user interface 114. The information may include new or modified recommendations. The steerable recommender user interface 114 may be updated to reflect the information, for example by displaying the new or modified recommendations.

While FIG. 1 shows one device 104, there may be multiple devices 104 each including a steerable recommender user interface 114. Further, while FIG. 1 shows one server 102, one instance of recommendation engine 110, and one recommendation data store 112, there may be multiple servers 102, multiple instances of recommendation engine 110 and multiple data stores 112. Further, different data stores 112 may be implemented that store recommendation information for different categories of items, or different recommendation information for the same category of item.

Figure 2:
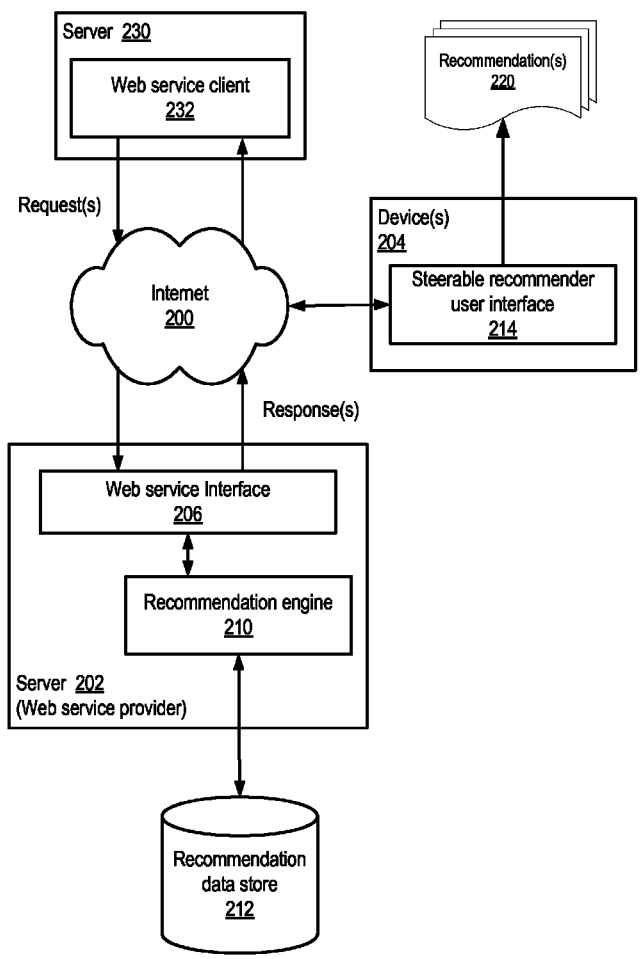
FIG. 2 is a block diagram that illustrates an example system configuration that provides a web service interface, and shows the interaction between a web service client and a web service provider, according to some embodiments.

While FIG. 1 illustrates an example networked environment configuration in which a server 102 hosts an instance of recommendation engine 110 and a recommendation data store 112, and a device 104 includes an instance of steerable recommender user interface 114, in some embodiments, a steerable recommender may be implemented as a web service. FIG. 2 is a block diagram that illustrates an example system configuration that provides a web service interface, and shows the interaction between a web service client and a web service provider, according to some embodiments. In this example, a web service interface 206 may be implemented on a server 202 coupled to Internet 200. This server 202 may be referred to as a web service provider. Server 202, or alternatively one or more other servers coupled to server 202, may include one or more instances of recommendation engine 210. Server 202 may be coupled to data storage for storing recommendation data store 212. An example computer system that may be used as a server 202 is illustrated in FIG. 14.

Server 230 may be coupled to Internet 200. An example computer system that may be used as a server 230 is illustrated in FIG. 14. Server 230 may host a web service client 232. Web service client 232 may be configured to programmatically access recommendation engine 210 via web service interface 206. Note that web service interface 206 does not provide a "web browser" interface, but instead provides a programmatic interface via an API through which at least some functionality of recommendation engine 210 may be programmatically accessed by web service client 232. Server 230 may provide a web site accessible to client(s) via web browsers on device(s) 204, and web service client 232 may be configured to access at least some functionality of recommendation engine 210 via web service interface 206 to provide access to at least some functionality of recommendation engine 210 via the web site provided by server 230. Device 204 may, for example, be representative of a personal desktop or portable computer system, or of any of various types of personal electronic devices with network connectivity such as a portable digital audio file player (e.g., an MP3 player), personal digital assistant (PDA), or cell phone. An example computer system that may be used as a device 204 is illustrated in FIG. 14. The web site may display a steerable recommender user interface 214 as or on one or more pages of the web site. The user may submit requests for recommendations to the steerable recommender via the user interface 214. A user may, for example, specify an artist name or a song via the steerable recommender user interface 214, may submit a tag cloud, may modify a tag in a displayed tag cloud, or may provide some other input to the steerable recommender via the user interface. The user input may be sent to the web service client 232 via the Internet 200 in one or more messages.

To access the recommendation engine 210 provided by the web service provider 202, web service client 232 may, in response to user input to the steerable recommender user interface 214 displayed on device 204, send a request message to web service interface 206 via Internet 200. Web service provider 202 may then process the request, for example by performing an indicated function of the recommendation engine 210. To process the request, recommendation engine 210 may access recommendation data store 212 to find recommendations by comparing the tag clouds of items in the data store 312 with a tag cloud provided by the user via the user interface 314. Web service interface 206 may then return results of the processing to the web service client 232 in a response message or messages via Internet 200. The results may include new or modified recommendations. Web service client 232 then sends appropriate information to steerable recommender user interface 214 so that the user interface 214 is updated to reflect the information, for example by displaying the new or modified recommendations.

While FIG. 2 shows one server 230, one web service client 232, and one device 204, there may be multiple servers 230 each hosting one or more web service clients 232, and there may be multiple devices 204 each including a steerable recommender user interface 214. Further, while FIG. 2 shows one instance of recommendation engine 210 and one recommendation data store 212, there may be multiple instances of recommendation engine 210 and multiple data stores 212. Further, different data stores 212 may be implemented that store recommendation information for different categories of items, or different recommendation information for the same category of item.

Figure 3:
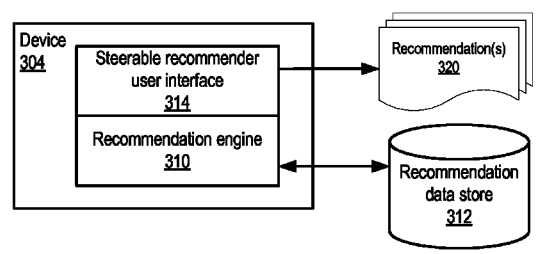
FIG. 3 is a block diagram that illustrates a steerable recommender and a user interface to the steerable recommender implemented on one device, according to some embodiments.

FIG. 3 is a block diagram that illustrates a steerable recommender and a user interface to the steerable recommender implemented on one device, according to some embodiments. In these embodiments, a device 304 may include an instance of recommendation engine 310 and an instance of steerable recommender user interface 314. An example computer system that may be used as a device 304 is illustrated in FIG. 14. Steerable recommender user interface 314 may, for example, be implemented as a page or pages displayable on or by a web browser. Alternatively, steerable recommender user interface 314 may be implemented as or on one or more display pages of some other software program. The user may submit requests for recommendations to the steerable recommender via the user interface 314. A user may, for example, specify an artist name or a song via the steerable recommender user interface 314, may submit a tag cloud, may modify a tag in a displayed tag cloud, or may provide some other input to the steerable recommender via the user interface. The user input may be provided to the recommendation engine 310. Recommendation engine 310 may then process the information to generate results. To process the request, recommendation engine 310 may access recommendation data store 312 to find recommendations by comparing the tag clouds of items in the data store 312 with a tag cloud provided by the user via the user interface 314. Recommendation data store 312 may be stored locally, or alternatively may be stored remotely and accessed via a network. The results may include new or modified recommendations. The steerable recommender user interface 314 may be updated to reflect the results, for example by displaying the new or modified recommendations.

Figure 4:
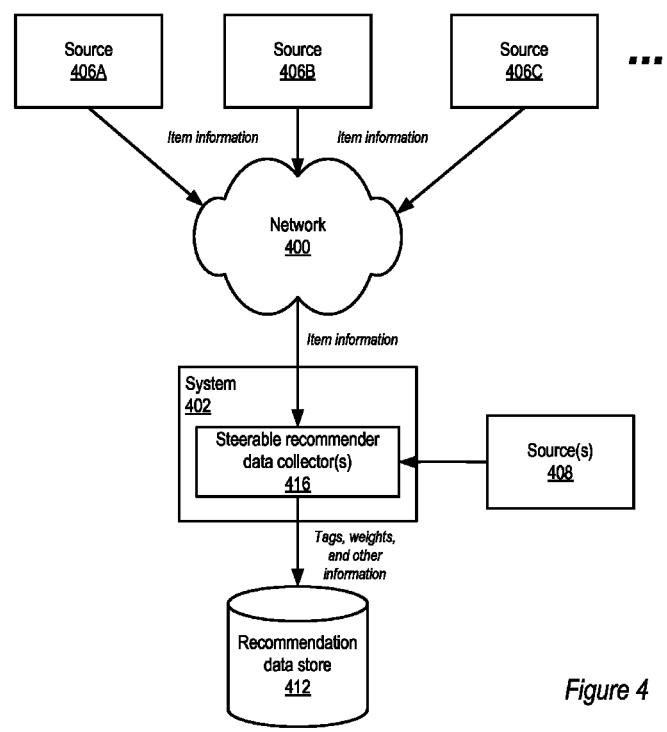
FIG. 4 is a block diagram that illustrates collecting item information for a steerable recommender, according to some embodiments.

In embodiments of the steerable recommender, each item may be described by a set of textual words or phrases, collectively referred to herein as tags. These descriptive tags may come from text mining the web, social annotations, auto-tagging based upon content analysis, expert annotation, etc. FIG. 4 is a block diagram that illustrates collecting item information for a steerable recommender, according to some embodiments. A system 402 may include one or more steerable recommender data collectors 416 that are configured to collect item information from one or more network sources 406 via a network 400. Examples of network sources 406 may include, but or not limited to, text mining web sites that include social annotations, expert opinions, product reviews, and so on. An example computer system that may be used as system 402 is illustrated in FIG. 14. Steerable recommender data collector(s) 416 may process the collected item information and store tags and other information according to the items in recommendation data store 412. While this data collection may be performed initially to generate an initial data store 412, data collectors 416 may periodically or aperiodically collect additional information about items or collect information about new items via the network 400, process the information, and store the processed information to the data store 412.

In addition to or instead of collecting item information from network sources 406, a data collector may collect, process and store item information from one or more other sources 408. An example of another source may be auto-tagging based upon content analysis. In this case, content of an item (e.g., of a book, song, or album) may be programmatically analyzed to automatically generate tags for the item. Another example may be direct user input of descriptive tags for particular items via a steerable recommender management interface.

After collection and processing of the item information related to a set of items, the tags thus generated for the items may be weighted based upon their descriptive content, with more descriptive tags given more weight than less descriptive tags. In one embodiment, a standard weighting function, such as term frequency-inverse document frequency (TF-IDF), may be used to determine these weights. The set of weighted tags for an item may be referred to as the item's tag cloud. Information on a collection of many items of a particular category of item, including but not limited to the items' tag clouds, may be stored to the recommendation data store 412. In one embodiment, a data collector component 416 of the steerable recommender may perform acquisition, processing, storing, and maintenance (e.g., updating) of the item information in the data store 412.

Figure 5:
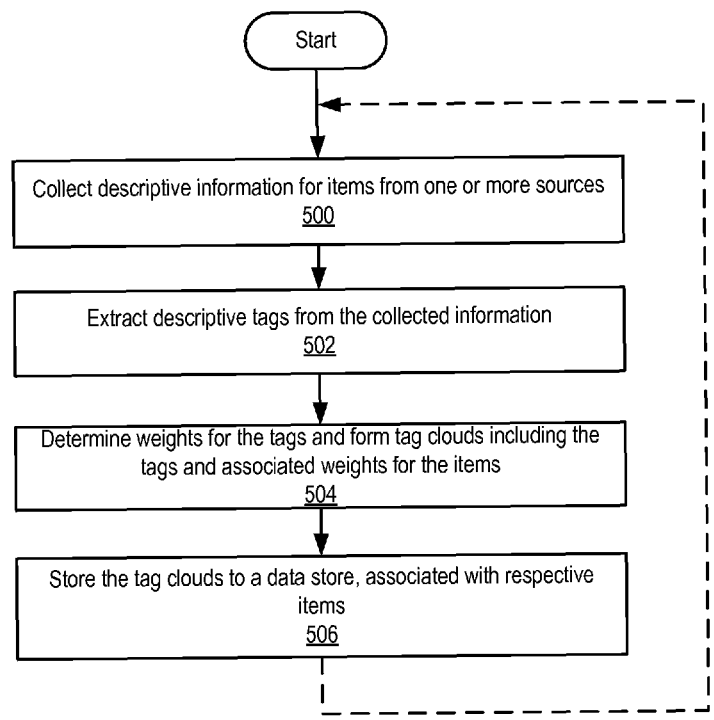
FIG. 5 illustrates a method for constructing and maintaining a data store of information for items including descriptive tags and tag clouds for the items according to one embodiment.

FIG. 5 illustrates a method for constructing and maintaining a data store of information including descriptive tags and tag cloud information according to one embodiment. As indicated at 500, descriptive information for items may be collected from one or more sources. In one embodiment, one or more steerable recommender data collectors may collect item information from one or more network sources. Examples of network sources may include, but or not limited to, text mining web sites that include social annotations, expert opinions, product reviews, and so on. In addition to or instead of collecting item information from network sources, a data collector may collect, process and store item information from one or more other sources. An example of another source may be auto-tagging based upon content analysis. Another example may be direct user input of tags for particular items via a steerable recommender management interface.

As indicated at 502, descriptive tags may be extracted from the collected information. The descriptive tags may include meaningful words or phrases that describe the items. One or more descriptive tags may be extracted for each item. As indicated at 504, weights may be determined for the tags, and tag clouds including the tags and associated weights may be generated for the items. To emphasize words that are more descriptive, each term may be weighted using a weighting function. In one embodiment, the standard text retrieval weighting function TF-IDF may be used. This weighting function gives more weight to tags that occur more frequently for a particular item when compared to the frequency of the tags across all items. Other weighting functions or methods of weighting tags may be used in other embodiments. The set of one or more weighted tags for an item may be referred to as an item's tag cloud, textual aura, or simply aura. A tag cloud thus includes at least the descriptive tags and the associated weights for the tags. As indicated at 506, the tag clouds may be stored to a data store, and associated with respective items in the data store.

While this data collection may be performed initially to generate an initial data store, additional information for items may periodically or aperiodically be collected and processed according to elements 500 through 506, and/or information about new items may be collected according to elements 500 through 506, as indicated by the dashed line in FIG. 5.

Figure 6:
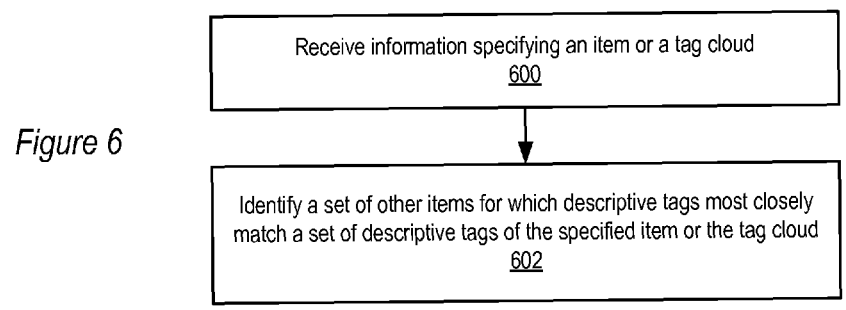
FIG. 6 illustrates a method for determining a set of recommended items from the descriptive information for a specified item, according to one embodiment.

FIG. 6 illustrates a method for determining a set of recommended items from the descriptive information for a specified item, according to one embodiment. As indicated at 600, a steerable recommender engine may receive information specifying an item or a tag cloud. For example, a user, via a user interface to the steerable recommender, may request recommendations for items similar to a particular item that the user likes. Alternatively, the user may select an item via the user interface, and a request for recommendations related to that item may be automatically generated for the user and submitted to the steerable recommender engine. In addition, a tag cloud for a particular item may be displayed on the user interface, and the user may modify the tag cloud, for example by interactively changing the weight of a particular tag, or by adding or removing a tag. The modification may automatically generate a request for updated recommendations corresponding to the modified tag cloud. Thus, the information received by the recommendation engine in response to a generated request may include information identifying the current state of the tag cloud, for example identifying the tags currently in the cloud and the current weights of the tags in the cloud. Other methods of generating a request for recommendations are possible and contemplated.

Note that the request for recommendations related to a particular item may, but does not necessarily, include information related to the tag cloud for the item. For example, the request may only identify the item, and the recommendation engine may obtain the tag cloud for the item from the data store, or from some other location if the tag cloud is not in the data store. In one embodiment, if there is no tag cloud for an item, the recommendation engine may dynamically generate a tag cloud for the item, for example according to the method illustrated in FIG. 5.

In another scenario, the user may submit a custom tag cloud not associated with any particular item to the steerable recommender via the user interface to request recommendations related to items whose tag clouds are most similar to the custom tag cloud.

As indicated at 602, a set of other items for which descriptive tags most closely match a set of descriptive tags of the specified item or tag cloud may be identified. If the request specifies a tag cloud related to an item and the current state of the tag cloud according to the user's preference (e.g., the current set of tags and associated weights for the tag cloud as possibly modified by the user), or if the request specifies a custom tag cloud not related to a particular item, then the tag cloud specified by the request may be used to identify similar items. Otherwise, if the request only specifies an item, then the steerable recommender engine may obtain a tag cloud for the item, as indicated above, and use that tag cloud to identify similar items.

In one embodiment, the recommendation engine may use standard vector space distance calculations, for example the cosine distance between the tag clouds, to determine similarity of the specified tag cloud to tag clouds of items in the data store. In one embodiment, the results of a find similar operation may be filtered by a recommendation engine component of the steerable recommender to optimize relevance, novelty and familiarity in accordance with specified preferences of the user. The results generated is a set or list of items that are similar to the specified item according to comparisons of the tag clouds, or a set or list of items whose tag clouds are similar to a specified custom tag cloud if the user has submitted a custom tag cloud not related to a particular item. A value indicating the determined strength of the similarity to the specified item according to the tag clouds may be included with each item. At least a subset of the list of items, and the associated strength of similarity value, may be displayed to the user interface. The user interface may include a scrollbar or other user interface element that allows a user to view additional items on the list if all the items cannot be displayed in the space provided. One embodiment may provide a similarity threshold that filters the list so that only items whose strength of similarity value is above the threshold are included in the list. One embodiment may provide a count threshold so that only a specified number of most similar items are included in the list. In some embodiments, the thresholds may be user-specified via the user interface.

In addition to filtering for similarity, some embodiment may provide one or more other filters, for example filters for novelty and familiarity. The user interface may provide methods for the user to specify values and/or settings for these filters. A novelty filter may be provided that filters recommendations so that items that are not already known by the user are recommended. For example, a music store recommender may track what items the user has already purchased or listened to. The recommender, via the novelty filter, may ensure that recommendations for the user only include items that are not in the set of previously purchased or listened to items. A familiarity filter may be provided that filters recommendations so that at least some items that are already known by the user are recommended, if possible. This may be important for a new user that may not have confidence in the recommender. By including some items in a recommendation list that the new user is likely to be familiar with, the user may gain some confidence and trust in the recommender. If a recommendation includes some items that the user already knows and likes, the user may be more likely to trust the recommender.

In one embodiment, the recommender may be tuned using the filters so that recommendation lists include a mix of novel items and familiar items. The ratio of novel to familiar items may change over time; as the user gains more confidence in the recommender, the amount of novel items compared to familiar items in recommendation lists may be increased.

Figure 7:
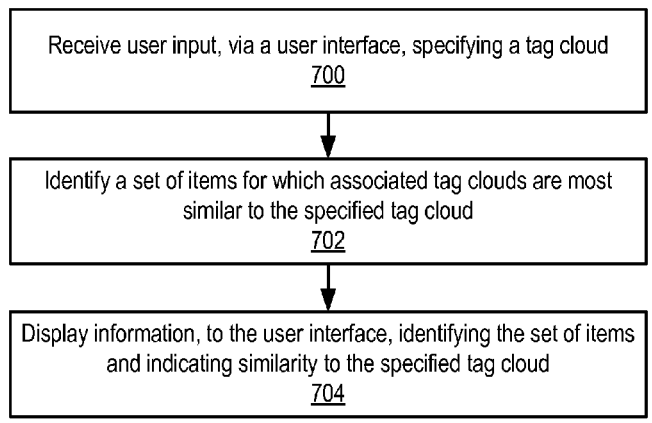
FIG. 7 illustrates a method for generating and displaying recommendations in response to user input, according to one embodiment.
Figure 11:
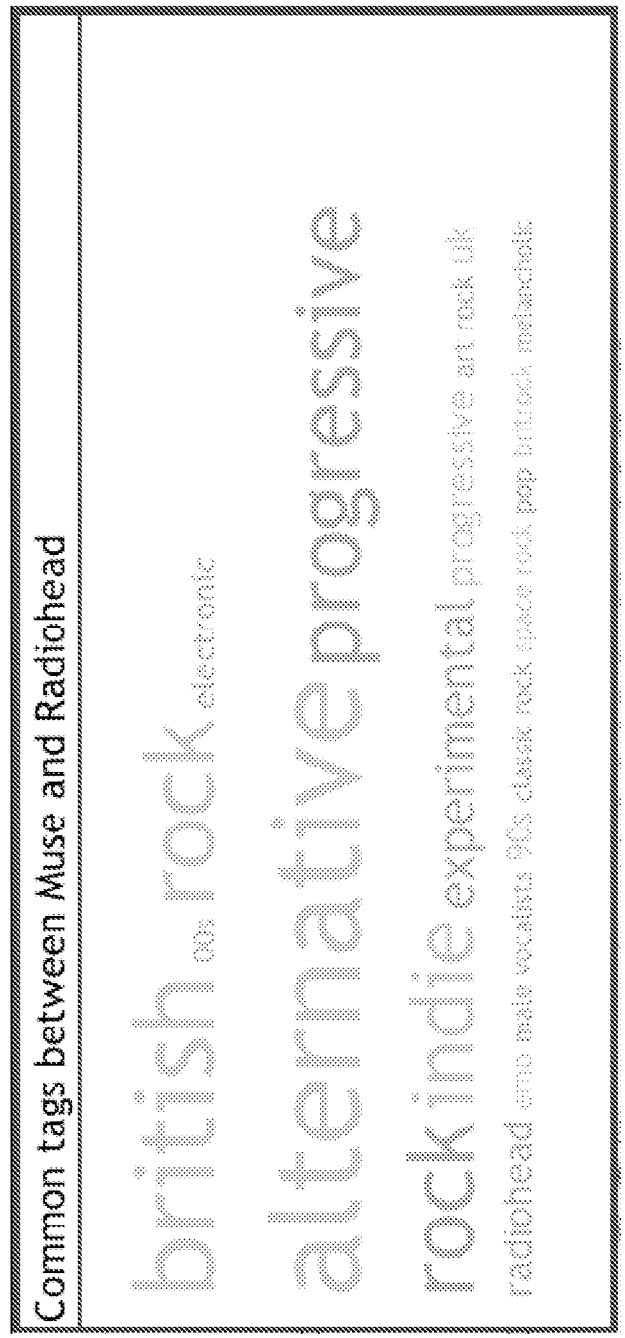
FIG. 11 shows an example of a tag cloud including overlapping or common tags for two artists in which the size of the font used for a tag is determined by the weight of the tag to visually indicate the strength of the overlap, according to one embodiment.
Figure 12:
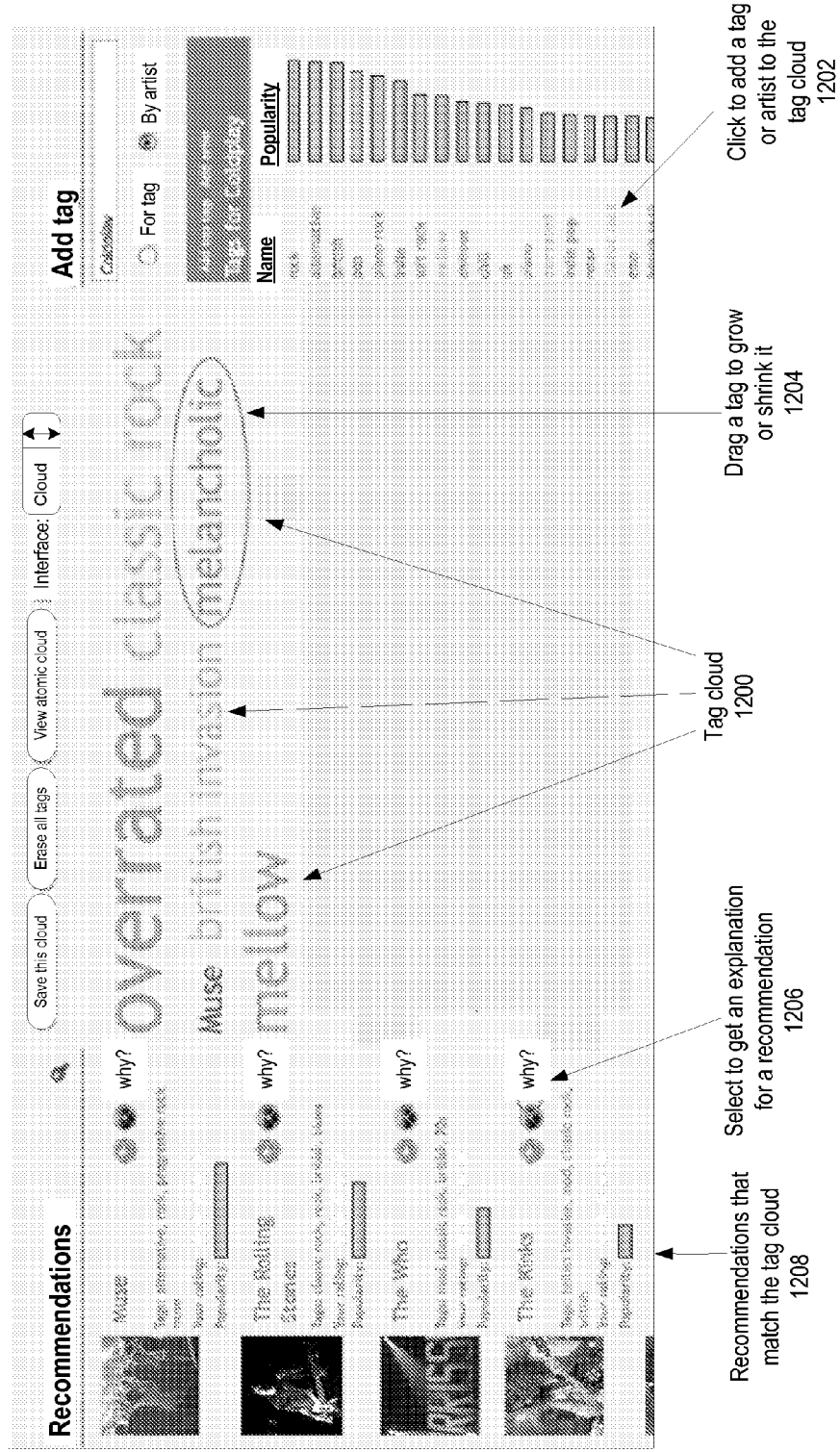
FIG. 12 illustrates an example of a steerable recommender user interface according to one embodiment.
Figure 13:
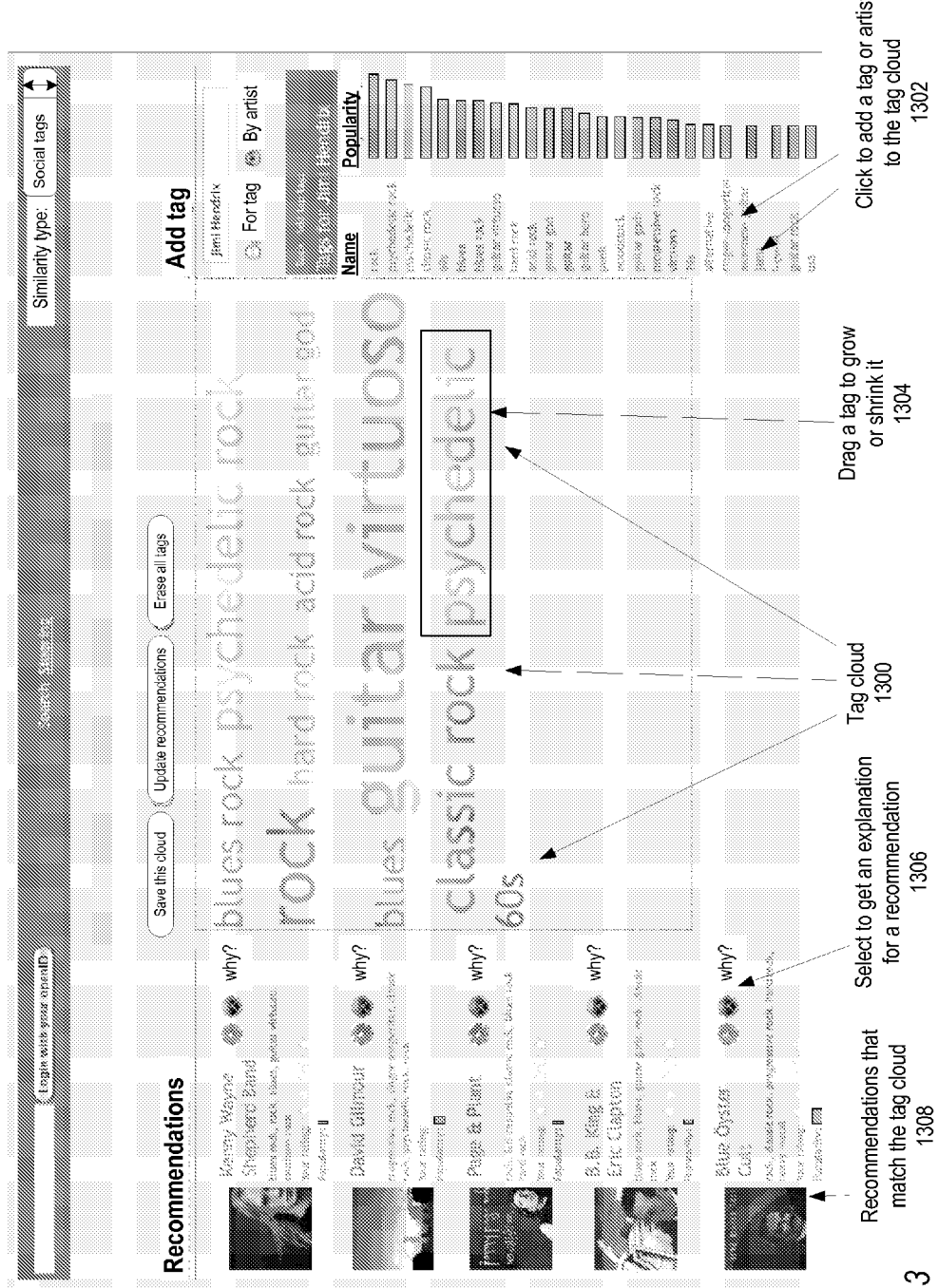
FIG. 13 illustrates another example of a steerable recommender user interface according to one embodiment.

FIG. 7 illustrates a method for generating and displaying recommendations in response to user input, according to one embodiment. As indicated at 700, a steerable recommender may receive user input, via a steerable recommender user interface, specifying a tag cloud. The tag cloud may include one or more tags and the respective weights for the tags. FIGS. 11 through 13 illustrate exemplary user interfaces to a steerable recommender. For example, a user, via the user interface, may request recommendations for items similar to a particular item that the user likes. Alternatively, the user may simply select an item via the user interface. In addition, a tag cloud for a particular item may be displayed on the user interface, and the user may modify the tag cloud, for example by interactively changing the weight of a particular tag, or by adding or removing a tag. As another alternative, the user may submit a custom tag cloud not associated with any particular item to the steerable recommender via the user interface. Other methods of accepting user input via a user interface specifying a tag cloud and related information are possible and contemplated.

Note that the user input may, but does not necessarily, retrieve information related to the tag cloud from information currently displayed on the user interface. For example, the user input may only identify an item, and the steerable recommender may obtain the tag cloud and related information from the data store, or from some other location if the tag cloud is not in the data store. In one embodiment, if there is no tag cloud for a specified item, the recommendation engine may dynamically generate a tag cloud for the item in response to user input, for example according to the method illustrated in FIG. 5.

As indicated at 702, a set of items for which associated tag clouds are most similar to the specified tag cloud according to the tags and associated weights may be identified. See, for example, element 602 of FIG. 6 and the related discussion above.

As indicated at 704, information may be displayed, to the user interface, identifying the set of items and indicating similarity to the specified tag cloud. The displayed information may include a set or list of items that are similar to the specified item according to comparisons of the tag clouds, or a set or list of items whose tag clouds are similar to a specified custom tag cloud, if the user has submitted a custom tag cloud not related to a particular item. A value indicating the strength of the similarity to the specified item may be displayed with each item. At least a subset of the list of items, and the associated strength of similarity value, may be displayed to the user interface. The user interface may include a scrollbar or other user interface element that allows a user to view additional items on the list if all the items cannot be displayed in the space provided. One embodiment may provide a similarity threshold that filters the list so that only items whose strength of similarity value is above the threshold are included in the list. One embodiment may provide a count threshold so that only a specified number of most similar items are included in the list. Other embodiments may include other user interface elements that allow a user to otherwise manipulate the list.

In addition to filtering for similarity, some embodiment may provide one or more other filters, for example filters for novelty and familiarity. The user interface may provide methods for the user to specify values and/or settings for these filters. A novelty filter may be provided that filters recommendations so that items that are not already known by the user are recommended. A familiarity filter may be provided that filters recommendations so that at least some items that are already known by the user are recommended, if possible.

In one embodiment, a user may select a displayed item in the list of recommended items, and the tag cloud for that item may then be displayed. In one embodiment, in response to the user selecting an item from the list, in addition to displaying the tag cloud for the selected item, the recommendation list may automatically be updated to display items recommended according to the tag cloud of the selected item. In one embodiment, a user may modify a currently displayed tag cloud via the user interface, for example by interactively changing the weight of a tag, or by adding or removing a tag, and the list of recommended items may be automatically updated to reflect the user's modification of the tag cloud.

Figure 8:
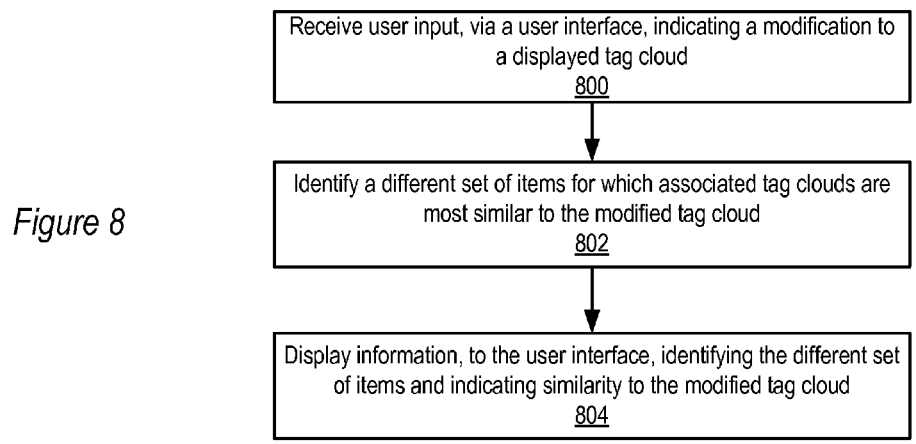
FIG. 8 illustrates a method for generating and displaying modified recommendations in response to user input modifying a tag cloud, according to one embodiment.

FIG. 8 illustrates a method for generating and displaying modified recommendations in response to user input modifying a tag cloud, according to one embodiment. FIGS. 11 through 13 illustrate exemplary user interfaces to a steerable recommender. As indicated at 800, a steerable recommender may receive user input, via a user interface to the steerable recommender, indicating a modification to a displayed tag cloud. For example, in one embodiment, the tag cloud (either a tag cloud related to an item or a user's custom tag cloud not related to any particular item) may be represented on a display screen such that higher weighted tags in the displayed tag cloud are shown in a larger font. The user may use a cursor control device, or in some embodiments the keyboard, to adjust or manipulate the tags in the tag cloud displayed on the user interface. For example, the user may, via the user interface, add new tags, remove tags, or increase or decrease the weights of the tags via a cursor control device click-and-drag to resize the tags. In one embodiment, the user may make the weight of a tag go negative, indicating that the user wants to avoid items with that tag. In one embodiment, the user interface may allow a user to indicate that a particular tag or tags must appear in the tag cloud of a recommended item. In other words, only items tagged with a tag or tags so indicated will be recommended.

As indicated at 802, a different set of items for which associated tag clouds are most similar to the modified tag cloud may be identified. See, for example, element 602 of FIG. 6 and the related discussion above.

As indicated at 804, information may be displayed, to the user interface, identifying the different set of items and indicating similarity of the items to the modified tag cloud. In one embodiment, the list of recommended items may be automatically updated to reflect the user's modification of the tag cloud.

Figure 9:
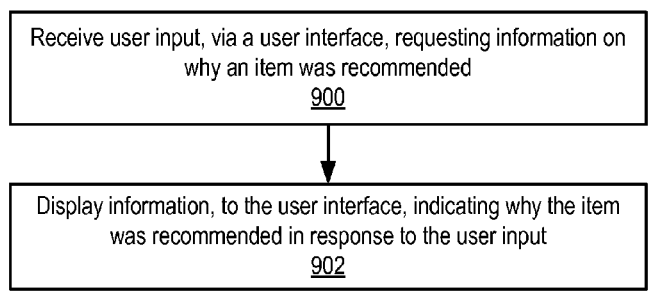
FIG. 9 illustrates a method for displaying information as to why a particular recommendation was made, according to one embodiment.

FIG. 9 illustrates a method for displaying information as to why a particular recommendation was made, according to one embodiment. As indicated at 900, a steerable recommender may receive user input, via a user interface to the steerable recommender, requesting information on why an item was recommended. In one embodiment, a user interface element may be associated with each item in the displayed list of recommended items. A user may select this interface element to request information on why the particular item was recommended. See, for example, element 1206 of FIG. 12 and element 1306 of FIG. 13.

As indicated at 902, information may be displayed, to the user interface, indicating why the item was recommended in response to the user input. In one embodiment, since recommendations made by the steerable recommender are based on the similarity between a user-specified tag cloud and the tag clouds of the recommended item(s), a more detailed explanation of why an item was recommended may be provided by displaying how the two tag clouds overlap. See, for example, FIGS. 11.

Steerable Recommender and User Interface Examples

In this section, an example embodiment of a web-based steerable recommender application, and examples of a user interface to the steerable recommender, that together provide transparent and steerable recommendations for music and musical artists are described. The steerable recommender, via the user interface, may provide a detailed explanation about why a particular item was recommended, and may allow a user to steer the recommendations based upon attributes of the music and/or artist. Note that this embodiment is described as an example, and is not intended to be limiting. Embodiments of the steerable recommender may be directed at other categories of items, and variations on the provided examples of the user interface are possible and contemplated.

Figure 10:
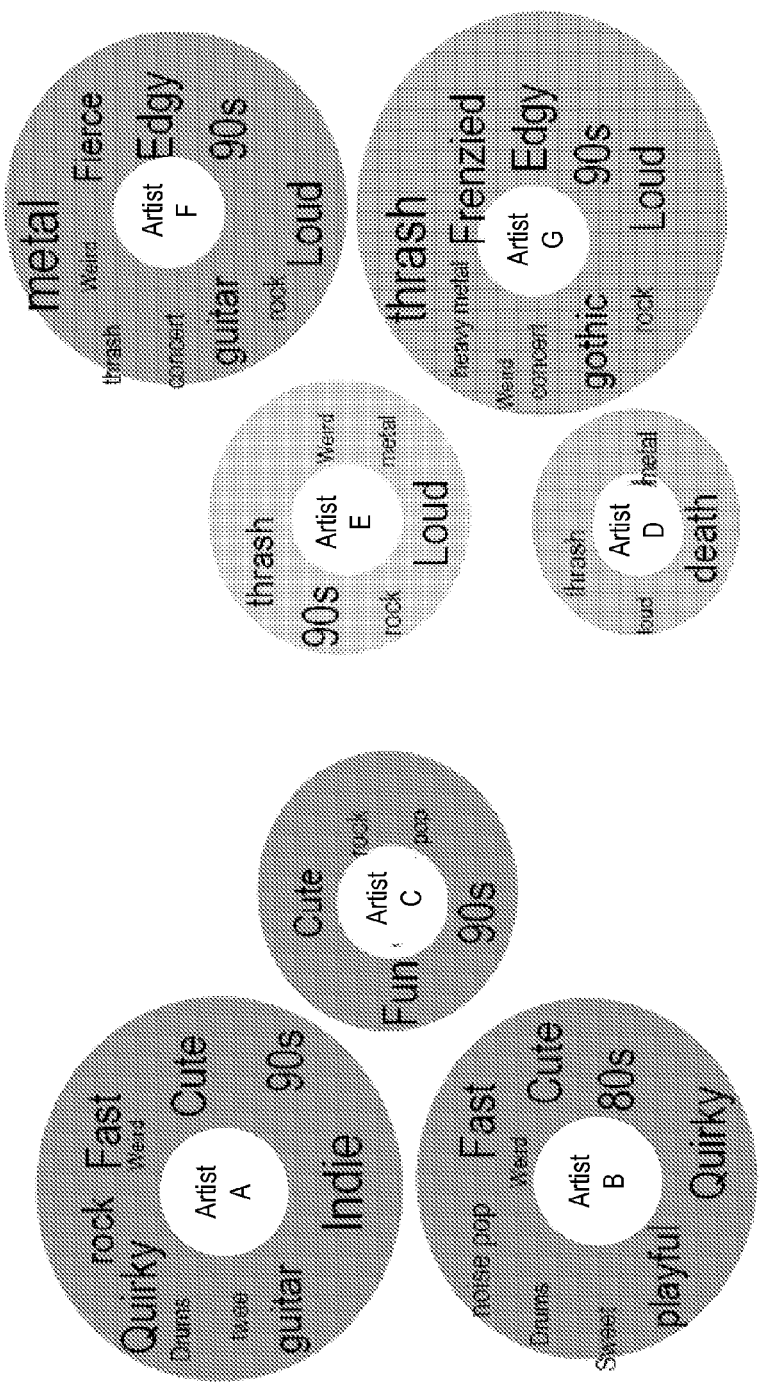
FIG. 10 graphically illustrates examples of tag clouds for several example artists according to one embodiment.

FIG. 10 graphically illustrates examples of tag clouds for several example artists A through G according to one embodiment. In the example embodiment, each musical artist is annotated by a set of descriptive words and phrases, or tags, which, when weighted, collectively form a tag cloud (tags and associated weights) for the musical artist. The source of these tags may, for example, be from text mining the web, from social annotations, autotagging based upon content analysis, expert annotation, etc. Some tags such as rock and alternative are commonly applied to many musical artists, and therefore are not very descriptive, while tags such as shoegaze and grindcore are less frequently applied and are thus more discriminating. To emphasize tags that are more descriptive, each tag may be weighted using a weighting function. In one embodiment, the standard text retrieval weighting function TF-IDF may be used to weight the tags. This weighting function gives more weight to tags that occur more frequently for a particular item when compared to the frequency of the tags across all items. Other weighting functions or methods of weighting tags may be used in other embodiments. The set of weighted tags for an item may be referred to as an item's tag cloud, textual aura, or simply aura. This tag cloud may be displayed to a user interface as a representation of a musical artist. In one embodiment, the similarity between two musical artists may be determined as the cosine similarity between the weighted tags in tag clouds for the artists. As in the examples shown in FIG. 10, the relative font size of a tag may indicate the tag's respective weight, with tags in larger fonts for a particular artist representing tags given more weight for the respective artist. Other methods than font size, such as different colors, shades, fonts, or case, may be used in some embodiments to graphically and/or textually provide additional information about the tags and/or tag clouds. For example, in one embodiment, a red color for a tag may indicate that the tag is a "negative" tag.

Transparency

A key to the success of a recommender is to gain the trust of its users. One way to gain this trust is to provide a detailed explanation of why an item was recommended. However, most conventional music recommenders rely on collaborative filtering techniques to offer recommendations. These systems cannot offer any more detailed explanation of why an item was recommended beyond the simplistic "people who liked artist X, also liked artist Y." These opaque recommendations do little to garner the trust of the user.

Since recommendations made by embodiments of the steerable recommender are based on the similarity between the tag clouds of a user-preferred item and the recommended item(s), embodiments may provide a more detailed explanation of why an item was recommended by displaying how the two tag clouds overlap. FIG. 11 shows an example tag cloud including the overlapping or common tags for the artists Muse and Radiohead, according to one embodiment. Only words common to the two artists are displayed. The tags in this tag cloud may be weighted by the strength of the overlap between the two clouds. In this example, the size of the font used for a tag may be determined by the weight of the tag to visually indicate the strength of the overlap. Thus, tags with a higher weight and stronger overlap are displayed in a larger font size than tags with lower weight and weaker overlap to visually indicate the relative weights of the tags. Other methods than font size may be used to graphically and/or textually indicate the tag weight and overlap metrics.

Some embodiments may provide one or more selectable user interface items via which the user may request additional information about a recommendation. For example, in one embodiment, there may be a "Why?" user interface element displayed by each recommendation. The user may select this item to display information as to why the recommendation was made, e.g. information on how the tag cloud of this item and the tag cloud of the item on which the recommendation was based interact.

Steerability

When a user receives a set of recommendations based upon a seed item, e.g. a musical artist, the user may decide that the steerable recommender is giving too much weight to a certain aspect of the seed item, and too little weight to another. In conventional recommenders, there is little if anything that the user can do guide the recommender toward aspects that the user finds desirable. Using an embodiment of the steerable recommender, the user has more control over the aspects that the recommender uses to generate the recommendations.

To steer recommendations with an embodiment of the steerable recommender, a user may interact with a tag cloud for a seed artist. The seed artist is an initial artist from which a user may start a search for recommendations. In one embodiment, a user may also start with a seed tag cloud to locate artists according to the user's taste. The user may, for example, add tags, remove tags or adjust the weight of any tag in the tag cloud. Whenever the user makes changes, the set of recommended artists is updated to include the artists that best match the new tag cloud. For example, a fan of 60s psychedelic guitarist Jimi Hendrix could adjust the Jimi Hendrix tag cloud to give more weight to the guitar tag and less weight to the 60s and the psychedelic tags to steer the recommender toward guitarists that sound like Jimi Hendrix, and away from other 60s psychedelia artists. The recommender would respond by recommending artists more like Stevie Ray Vaughan and less like Janis Joplin or The Doors.

FIG. 12 illustrates an example of a steerable recommender user interface directed at musical artists according to one embodiment. In this example, the user has started with a tag cloud based upon the top tags for the artist Coldplay. The user has also added the artist Muse to the tag cloud. This has the effect of implicitly including all of the tags for Muse in the tag cloud. As indicated at 1202, a user may add tags or artists to the tag cloud 1200 by clicking on the tags in the right hand panel. As indicated at 1204, a user can increase or decrease the weight of an individual tag by dragging it with the cursor control device to increase or decrease its size; increasing the size increases the weight, while decreasing the size decreases the weight. In one embodiment, a tag that is shrunk below the size of zero begins to grow again as a negative tag that acts as a filter in the returned recommendations 1208. A negative tag may, for example, be indicated by coloring the tag differently. For example, in one embodiment, negative tags may be colored red. Tags with negative weights act as filters—artists tagged with a negatively weighted tag will not be recommended.

In one embodiment, the user interface may allow a user to indicate that a particular tag or tags must appear in the tag cloud of a recommended item. In other words, in this example, only artists tagged with a tag or tags so indicated will be recommended.

A user interface element may be associated with each recommendation 1208 which the user may select to get more information on why the particular item was recommended, as indicated at 1206. In one embodiment, since recommendations made by the steerable recommender are based on the similarity between a user-specified tag cloud and the tag clouds of the recommended item(s), a more detailed explanation of why an item was recommended may be provided by displaying how the two tag clouds overlap. See, for example, FIG. 11.

Whenever the tag cloud 1200 is modified, a new set of artists with tag clouds most similar to the modified tag cloud 1200 may be identified, and the user interface may display an updated list of recommendations 1208 corresponding to the new set of artists. These are the artists that most closely match the tag cloud 1200 that the user has constructed or modified. In various embodiments, the user may, for example, listen to a recommended artist, view photos of the artist, inspect the tag cloud of an artist, or rate the artist. The user may then modify the tag cloud 1200 to steer the recommendations 1208 away from undesirable artists and toward more relevant or desirable artists. This dynamic, iterative approach to recommendations puts the user in control of the recommender, in contrast to conventional recommenders that use collaborative filtering and that typically gives a user little or no control.

FIG. 13 illustrates another example of a steerable recommender user interface directed at musical artists, according to one embodiment. In this example, the user has started with a tag cloud based upon the top tags for the artist Jimi Hendrix. The indicated user interface elements 1300, 1302, 1304, 1306 and 1308 are similar to the user interface elements 1200, 1202, 1204, 1206 and 1208, respectively, of FIG. 12.

Example System

Various components of embodiments of a method and apparatus for generating steerable recommendations as described herein, for example a recommendation engine, a steerable recommender user interface, and/or a steerable recommender data collector, may be executed on one or more computer systems, which may interact with various other devices. One such computer system is illustrated by FIG. 14. In the illustrated embodiment, computer system 1400 includes one or more processors 1410 coupled to a system memory 1420 via an input/output (I/O) interface 1430. Computer system 1400 further includes a network interface 1440 coupled to I/O interface 1430, and one or more input/output devices 1450, such as cursor control device 1460, keyboard 1470, audio device 1490, and display(s) 1480. In some embodiments, it is contemplated that embodiments may be implemented using a single instance of computer system 1400, while in other embodiments multiple such systems, or multiple nodes making up computer system 1400, may be configured to host different portions, components, or instances of embodiments. For example, in one embodiment some elements may be implemented via one or more nodes of computer system 1400 that are distinct from those nodes implementing other elements.

In various embodiments, computer system 1400 may be a uniprocessor system including one processor 1410, or a multiprocessor system including several processors 1410 (e.g., two, four, eight, or another suitable number). Processors 1410 may be any suitable processor capable of executing instructions. For example, in various embodiments, processors 1410 may be general-purpose or embedded processors implementing any of a variety of instruction set architectures (ISAs), such as the x86, PowerPC, SPARC, or MIPS ISAs, or any other suitable ISA. In multiprocessor systems, each of processors 1410 may commonly, but not necessarily, implement the same ISA.

In some embodiments, at least one processor 1410 may be a graphics processing unit. A graphics processing unit or GPU may be considered a dedicated graphics-rendering device for a personal computer, workstation, game console or other computer system. Modern GPUs may be very efficient at manipulating and displaying computer graphics, and their highly parallel structure may make them more effective than typical CPUs for a range of graphical algorithms. For example, a graphics processor may implement a number of graphics primitive operations in a way that makes executing them much faster than drawing directly to the screen with a host central processing unit (CPU). The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1420 may be configured to store program instructions and/or data accessible by processor 1410. In various embodiments, system memory 1420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for various embodiments of a method and apparatus for generating steerable recommendations, are shown stored within system memory 1420 as program instructions 1425 and data storage 1435, respectively. In other embodiments, program instructions and/or data may be received, sent or stored upon different types of computer-accessible media or on similar media separate from system memory 1420 or computer system 1400. Generally speaking, a computer-accessible medium may include storage media or memory media such as magnetic or optical media, e.g., disk or CD/DVD-ROM coupled to computer system 1400 via I/O interface 1430. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1440.

In one embodiment, I/O interface 1430 may be configured to coordinate I/O traffic between processor 1410, system memory 1420, and any peripheral devices in the device, including network interface 1440 or other peripheral interfaces, such as input/output devices 1450. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. In addition, in some embodiments some or all of the functionality of I/O interface 1430, such as an interface to system memory 1420, may be incorporated directly into processor 1410.

Network interface 1440 may be configured to allow data to be exchanged between computer system 1400 and other devices attached to a network, such as other computer systems, or between nodes of computer system 1400. In various embodiments, network interface 1440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1450 may, in some embodiments, include one or more display terminals, keyboards, keypads, touchpads, scanning devices, voice or optical recognition devices, or any other devices suitable for entering or retrieving data by one or more computer system 1400. Multiple input/output devices 1450 may be present in computer system 1400 or may be distributed on various nodes of computer system 1400. In some embodiments, similar input/output devices may be separate from computer system 1400 and may interact with one or more nodes of computer system 1400 through a wired or wireless connection, such as over network interface 1440.

As shown in FIG. 14, memory 1420 may include program instructions 1425, configured to implement embodiments of method and apparatus for generating steerable recommendations, and data storage 1435, comprising various data accessible by program instructions 1425. In one embodiment, program instructions 1425 may include software elements of embodiments of a method and apparatus for generating steerable recommendations, as illustrated in the above Figures. Data storage 1435 may include data that may be used in embodiments. In other embodiments, other or different software elements and data may be included.

Those skilled in the art will appreciate that computer system 1400 is merely illustrative and is not intended to limit the scope of a method and apparatus for generating steerable recommendations as described herein. In particular, the computer system and devices may include any combination of hardware or software that can perform the indicated functions, including computers, network devices, internet appliances, PDAs, wireless phones, pagers, etc. Computer system 1400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1400 may be transmitted to computer system 1400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
   displaying a tag cloud in response to user input specifying the tag cloud,
      wherein the tag cloud comprises one or more tags,
      wherein each tag specifies a descriptive word or phrase;
   determining a set of recommended items from a collection of items in response to the user input,
      wherein the set of recommended items is determined according to similarity of tag clouds associated with the items in the collection to the displayed tag cloud,
      wherein the set of recommended items comprises items for which a determined similarity value is above a similarity threshold; and
   displaying the set of recommended items.

2. The computer-implemented method as recited in claim 1, further comprising:
   receiving user input modifying the displayed tag cloud;
   determining a modified set of recommended items from the collection of items in response to the user input modifying the displayed tag cloud; and
   displaying the modified set of recommended items.

3. The computer-implemented method as recited in claim 2, wherein the user input modifying the displayed tag cloud increases or decreases a weight associated with a particular tag in the tag cloud, wherein increasing the weight increases an influence of the associated tag when determining the modified set of recommended items, and wherein decreasing the weight decreases the influence of the associated tag when determining the modified set of recommended items.

4. The computer-implemented method as recited in claim 2, wherein the user input modifying the displayed tag cloud adds or removes a tag from the tag cloud.

5. The computer-implemented method as recited in claim 1, further comprising:
   receiving user input selecting one of the displayed recommended items;
   determining another set of recommended items from the collection of items corresponding to the selected recommended item in response to the user input selecting the recommended item; and
   displaying the other set of recommended items.

6. The computer-implemented method as recited in claim 1, further comprising:
   receiving user input selecting one of the displayed recommended items; and
   displaying information related to why the selected item was recommended in response to the user input selecting the recommended item.

7. The computer-implemented method as recited in claim 6, wherein said displayed information indicates how the tag cloud associated with the selected recommended item overlaps the displayed tag cloud.

8. The computer-implemented method as recited in claim 1, further comprising filtering the set of recommended items so that items that are novel to the user are displayed.

9. The computer-implemented method as recited in claim 1, further comprising filtering the set of recommended items so that at least some items that are familiar to the user are displayed.

10. A system comprising:
    at least one processor;
    a display device; and
    a memory storing program instructions, wherein the program instructions are executable by the at least one processor to:
       display a tag cloud to a user interface on the display device in response to user input specifying the tag cloud,
          wherein the tag cloud comprises one or more tags,
          wherein each tag specifies a descriptive word or phrase;
       determine a set of recommended items from a collection of items in response to the user input,
          wherein the program instructions are executable by the at least one processor to determine the set of recommended items according to similarity of tag clouds associated with the items in the collection to the displayed tag cloud,
          wherein the set of recommended items comprises items for which a determined similarity value is above a similarity threshold; and
       display the set of recommended items to the user interface.

11. The system as recited in claim 10, wherein the program instructions are executable by the at least one processor to:
    receive user input modifying the displayed tag cloud;
    determine a modified set of recommended items from the collection of items in response to the user input modifying the displayed tag cloud; and
    display the modified set of recommended items.

12. The system as recited in claim 11, wherein the user input modifying the displayed tag cloud increases or decreases a weight associated with a particular tag in the tag cloud, wherein increasing the weight increases an influence of the associated tag when determining the modified set of recommended items, and wherein decreasing the weight decreases the influence of the associated tag when determining the modified set of recommended items.

13. The system as recited in claim 11, wherein the user input modifying the displayed tag cloud adds or removes a tag from the tag cloud.

14. The system as recited in claim 10, wherein the program instructions are executable by the at least one processor to:
    receive user input selecting one of the displayed recommended items;

determine another set of recommended items from the collection of items corresponding to the selected recommended item in response to the user input selecting the recommended item; and display the other set of recommended items.

15. The system as recited in claim 10, wherein the program instructions are executable by the at least one processor to:

receive user input selecting one of the displayed recommended items; and display information related to why the selected item was recommended in response to the user input selecting the recommended item, wherein said displayed information indicates how the tag cloud associated with the selected recommended item overlaps the displayed tag cloud.

16. A computer-readable storage medium storing program instructions, wherein the program instructions are computer-executable to implement:

displaying a tag cloud in response to user input specifying the tag cloud, wherein the tag cloud comprises one or more tags, wherein each tag specifies a descriptive word or phrase;

determining a set of recommended items from a collection of items in response to the user input, wherein the set of recommended items is determined according to similarity of tag clouds associated with the items in the collection to the displayed tag cloud, wherein the set of recommended items comprises items for which a determined similarity value is above a similarity threshold; and displaying the set of recommended items.

17. The computer-readable storage medium as recited in claim 16, wherein the program instructions are computer-executable to implement:

receiving user input modifying the displayed tag cloud;

determining a modified set of recommended items from the collection of items in response to the user input modifying the displayed tag cloud; and displaying the modified set of recommended items.

18. The computer-readable storage medium as recited in claim 17, wherein the user input modifying the displayed tag cloud increases or decreases a weight associated with a particular tag in the tag cloud, wherein increasing the weight increases an influence of the associated tag when determining the modified set of recommended items, and wherein decreasing the weight decreases the influence of the associated tag when determining the modified set of recommended items.

19. The computer-readable storage medium as recited in claim 16, wherein the program instructions are computer-executable to implement:

receiving user input selecting one of the displayed recommended items;

determining another set of recommended items from the collection of items corresponding to the selected recommended item in response to the user input selecting the recommended item; and displaying the other set of recommended items.

20. The computer-readable storage medium as recited in claim 16, wherein the program instructions are computer-executable to implement:

receiving user input selecting one of the displayed recommended items; and displaying information related to why the selected item was recommended in response to the user input selecting the recommended item, wherein said displayed information indicates how the tag cloud associated with the selected recommended item overlaps the displayed tag cloud.

* * * * *